July 22, 1941.   H. SONNENFELD   2,250,239
ELECTRICAL POWER CABLE
Filed Dec. 10, 1931

INVENTOR
Hugo Sonnenfeld

Patented July 22, 1941

2,250,239

UNITED STATES PATENT OFFICE 2,250,239

ELECTRICAL POWER CABLE

Hugo Sonnenfeld, Bratislava, Czechoslovakia, assignor to General Cable Corporation, New York, N. Y., a corporation of New Jersey Application December 10, 1931, Serial No. 580,203
In Austria December 10, 1930

4 Claims. (Cl. 174—26)

This invention relates to means for transmitting electrical power, and more particularly to a cable and cable system for the transmission of electrical power. It is an object of the invention to provide an improved cable and an improved cable system. Other objects and advantages of the invention will appear hereinafter.

The invention will be best understood from the following description when read in the light of the accompanying drawing of certain specific embodiments of the invention, the scope of which latter will be more particularly pointed out in the appended claims.

Figure 1:
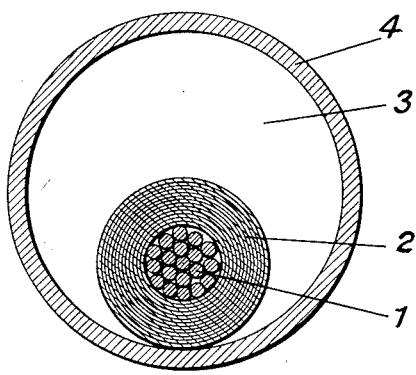
Fig. 1 is a transverse section through a length of cable.

The legends appearing on the drawing are by way of illustration and not limitation.

It is well known that the dielectric strength and electrical properties of insulating materials improve when the material is subjected to pressure. High tension lead covered cables filled with oil kept under pressure are also known. Their disadvantage is the difficult installation in grounds which are not absolutely level. The topographical inequalities of elevations cause additional oil pressure which results in great stresses of the lead sheath enclosing the cable core. The lead sheath, though it may be armoured too, is able to bear only limited internal pressures without harm to service maintenance. The value of internal pressure applied depends always upon the part of the cable situated lowest. Therefore the cable installation has to be divided into small sections connected to each other by complicated stop joints.

It has been proposed to subject the insulation of cables to pressure by pulling the completed lead cable into high pressure pipes, for example steel pipes, and by then applying pressure in the space left between the inner wall of the pipe and the outer surface of the cable, for example by means of oil, air or other suitable gas under pressure. Such a construction has the disadvantage that between the pressure fluid and the electrically active parts of a cable is an expensive interposed separating wall, namely, the lead sheath hermetically enclosing the cable insulation.

The subject of the present invention relates to insulated conductors pulled into or embedded in pipe systems resistant to high pressure, the insulation of said conductors being exposed to pressure, and wherein the liquid or gaseous pressure fluid contained in the pipe system is identical with the insulating fluid, either liquid or gaseous, penetrating fully or partly the well known layers of insulation.

By using pipe systems which are able to bear very high mechanical pressures, for example Mannesmann steel pipes, pressure can be applied which is considerably higher than pressures used hitherto in connection with oil filled, lead sheathed cables. Therefore the pressure applied to the cable insulation can be chosen very high, so that the dielectric is utilized more efficiently, and so that the differences in pressure arising in consequence of inequalities of topographical elevations when filling the pipe system with liquid become negligible when compared with the high average pressure maintained as long as the system is in service.

Because of the fact that according to this invention the liquid or pressure fluid filling the pipe system is identical with the insulating fluid contained in interstices formed by the layers of the solid insulating material of the cable, the lead sheath hitherto commonly used for protecting the cable insulation against damage from the outside is unnecessary. The same applies naturally to the rest of the armour. Thus considerable savings in raw material and space are accomplished. The circumstance mentioned above that a suitable gas can be used as the pressure fluid, and that the very same gas has to penetrate the interposed layers of the cable insulating material, makes it possible to use advantageously the cable construction of the present invention for low, medium and high tensions when applying a not too high pressure to gaseous pressure fluids. When using gas as the pressure medium it will be understood that practically no differences in pressure caused by the differences of topographical elevations will occur.

Fig. 1 presents in way of an example the subject of the invention. 1 is the metallic electrical conductor of the cable, 2 the porous or laminated insulation, for example paper, 3 is the space filled with a pressure fluid, which may be liquid or gaseous, for example an oil or carbonic acid, which penetrates fully or in part the laminated insulation 2. 4 is the mechanically strong pipe which can withstand very high pressures, for example a Mannesmann pipe or some kind of high pressure resistant, gas- or liquid-proof metallic flexible tube.

The cable, comprising the metallic conductor 1 and the layer insulation 2, is manufactured in the usual manner in the shop. Also drying and when required impregnating can be carried out in the factory. The two latter processes of manufacture may however be accomplished advantageously at the very place of installation. In this case the cable pulled into the pressure resistant pipe system 4 is dried, either by heating the conductor electrically, or by blowing hot air through the pipe system, or by evacuating the pipe system, or by a combination of these or any of the other well known means. Thereafter the pipe system is filled with the pressure fluid and exposed to pressure.

When the pressure produced by the gaseous or liquid pressure fluid is sufficiently high a drying of the material of the laminated insulation can be entirely omitted.

The insulated conductor may be laid directly on the wall of the pipe system 4, but if the cable is spaced by insulating pieces 5 (see Fig. 2), from the wall of the pipe system 4, the cable may be used at a tension considerably higher than in the case no provision was made to keep the cable spaced from the pipe wall, because the surface breakdown strength of the spacing means 5, on account of the high pressure to which the pressure fluid 3 around the spacing means 5 is subjected, is considerably increased. Proceeding that way one is able to design the laminated insulation even for high tension purposes relatively thin, that is thinner than in the case represented by Fig. 1, because on the spots where spacing pieces are arranged its breakdown strength is greater, and on all other places the breakdown strength of the pressure fluid 3 cooperate in addition to the breakdown strength of the laminated insulation 2.

To prevent damage of the insulated core 1, 2 when pulling it into the pipe system it may be advisable to protect the cable either with a ribbon wrapped on in close or open lay, or with wire, etc., applied already in the shop, so that the cable insulation will not be chafed when pulled into the pipe. This protecting means is designed so as not to bar penetration of the pressure fluid into the cable, for example by providing the protective ribbon with a smaller or bigger perforation. When a spiral of insulating material is used, it may be used in place of the spacing pieces 5.

When the insulated conductor 1, 2 is not to be pulled into a rigid pipe system, but the cable is, for instance, designed for submarine purposes and therefore encased in a flexible tube highly pressure resistant, it is advisable to cover such a tube on the outside as well as inside with a liquid-proof cover, made, for example, of gutta-percha. On the outside, furthermore, protective wires may be applied. Such a cable is then resistant against pressures acting from inside.

Figure 2:
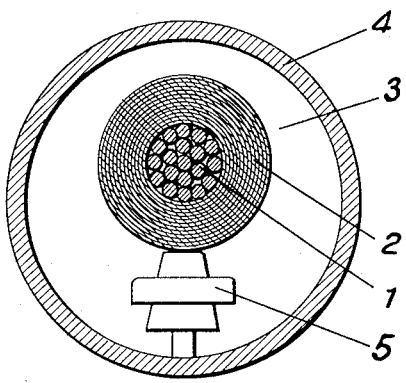
Fig. 2 is a transverse section through a slightly different type of cable.

In Figs. 1 and 2 as an example single conductor cables are shown but it will be understood that the invention is not confined to them and the invention can be extended very successfully to multiconductor cables. In such cases it will be valuable to strand the insulated conductors and to apply the said protective spiral around the strand. A well known belt insulation may be also, of course, arranged between the stranded conductors and the protective spiral, or this belt insulation can replace the protective spiral.

Figure 3:
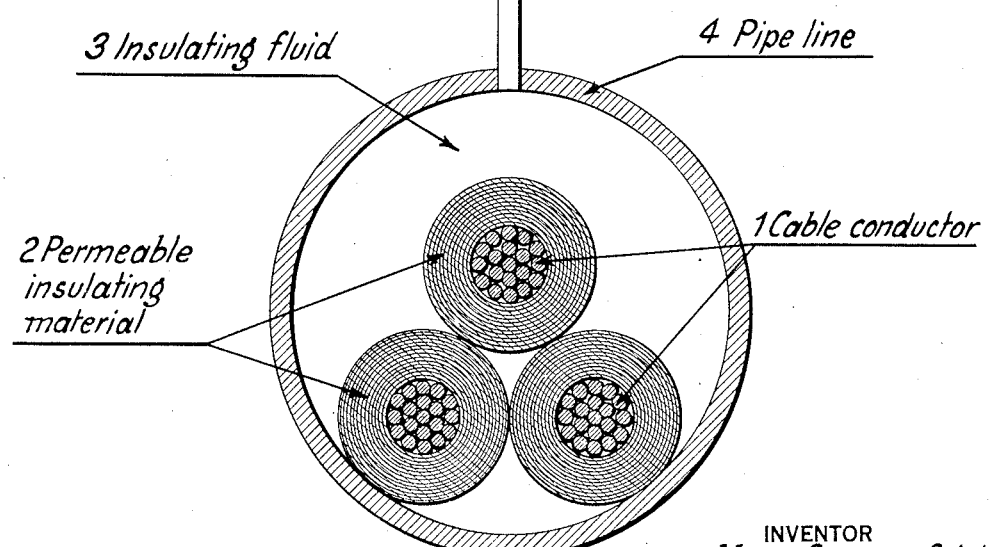
Fig. 3 is a transverse section through a multiple conductor cable.

Fig. 3 shows by way of example a multiconductor cable construction in which three conductors 1, each insulated with permeable insulating material 2, lie within the pipe line 4 filled with insulating fluid 3 which is maintained under high pressure by suitable means.

The subject of the invention is furthermore not limited by the suggestion, that the pressure fluid 3 has to be identical with the material impregnating the insulation 2. The pressure fluid may be, for instance, a very liquid pure oil, while the impregnating liquid of the layer insulation 2 might be the usual impregnating cable compound. The only essential fact is that these two fluids do not disturb each other.

What I claim is:

1. A high tension electric cable system, comprising in combination an unsheathed cable conductor insulated with permeable impregnated insulating material, a pipe line enclosing said conductor, the internal diameter of said pipe line relatively to the space occupied by the conductor and its insulation being such as to permit of said insulated conductor being drawn into the pipe line and to permit of its free movement transversely within the pipe line, oil filling the space in said pipe line unoccupied by the said conductor and its insulation and in which the conductor and its insulation are submerged, and means for maintaining said oil under sufficiently high pressure to increase its dielectric strength.

2. A high tension electric cable system, comprising in combination an unsheathed cable conductor insulated with permeable impregnated insulating material, a pipe line enclosing said conductor, the internal diameter of said pipe line relatively to the space occupied by the conductor and its insulation being such as to permit of said insulated conductor being readily drawn into the pipe line and to permit of its free movement transversely within the pipe line, an insulating fluid filling the space in said pipe line unoccupied by the said conductor and its insulation and in which the conductor and its insulation are submerged, and means for maintaining said insulating fluid under sufficiently high pressure to increase its dielectric strength.

3. A multi-conductor high tension electric cable system comprising in combination a plurality of cable conductors of the solid stranded type, each conductor being individually insulated with oil pervious impregnated insulating material and said conductors being free for relative lateral movement, a pipe line enclosing said conductors, the internal diameter of said pipe line relatively to the space occupied by the conductors and their insulation being such as to permit of said insulated conductors being drawn into the pipe line and to permit of their free movement relatively to each other within the pipe line to accommodate variations in their length incident to operation, oil filling the space in said pipe line unoccupied by the said insulated conductors, said insulated conductors being immersed in and in direct contact with said oil, and means for maintaining said oil under a pressure of not substantially less than five atmospheres to increase its dielectric strength and promote impregnation to the cable and the elimination of internal corona losses.

4. A multi-conductor high tension electric cable system comprising in combination a plurality of cable conductors, each conductor being individually insulated with fluid-pervious insulating material and said conductors being free for relative lateral movement, a pipe line enclosing said conductors, the internal diameter of said pipe line relatively to the space occupied by the conductors and their insulation being such as to permit of said insulated conductors being drawn into the pipe line and to permit of their free movement relatively to each other within the pipe line to accommodate variations in their length incident to operation, insulating fluid filling the space in said pipe line unoccupied by the said insulated conductors, said insulated conductors being immersed in and in direct contact with said insulating fluid, and means for maintaining said insulating fluid under a pressure of not substantially less than five atmospheres to increase its dielectric strength and promote impregnation of the fluid-pervious insulating material with the insulating fluid and the elimination of internal corona losses.

HUGO SONNENFELD.